US006485662B1

(12) United States Patent
Neubauer et al.

(10) Patent No.: US 6,485,662 B1
(45) Date of Patent: Nov. 26, 2002

(54) PROCESS FOR PREPARING A SIMULATED IN SITU POLYETHYLENE BLEND

(75) Inventors: Anthony Charles Neubauer, Piscataway, NJ (US); Leonard Sebastian Scarola, Union, NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 08/753,931

(22) Filed: Dec. 3, 1996

(51) Int. Cl.[7] ................................................. D01D 1/10
(52) U.S. Cl. ........................ 264/169; 525/240
(58) Field of Search ........................ 264/169; 425/197, 425/199; 525/240

(56) References Cited

U.S. PATENT DOCUMENTS

| 4,307,209 | A | * | 12/1981 | Morita et al. | 525/240 |
| 4,334,783 | A | | 6/1982 | Suzaka | 366/69 |
| 4,661,249 | A | | 4/1987 | Langley | 210/266 |
| 4,681,721 | A | | 7/1987 | Benoit et al. | 264/169 |
| 4,814,135 | A | * | 3/1989 | Heitz | 525/240 |
| 5,047,468 | A | * | 9/1991 | Lee et al. | 525/240 |
| 5,284,613 | A | * | 2/1994 | Ali et al. | 525/40 |
| 5,458,474 | A | | 10/1995 | Neubauer et al. | 425/202 |
| 5,494,965 | A | * | 2/1996 | Harlin et al. | 525/240 |
| 5,514,455 | A | * | 5/1996 | Michie, Jr. et al. | 525/240 |
| 5,539,076 | A | * | 7/1996 | Nowlin et al. | 525/240 |
| 5,631,069 | A | * | 5/1997 | Wooster et al. | 525/240 |

FOREIGN PATENT DOCUMENTS

| EP | 618314 | 10/1994 |
| EP | 618315 | 10/1994 |
| WO | WO96/16119 | 5/1996 |

OTHER PUBLICATIONS

Filtration of Polymer Melts, published by Kunststofftechnik, VDI–Verlag GmbH, Dusseldorf, Germany, 1981, pp. 1 to 7.

* cited by examiner

Primary Examiner—Mark Eashoo

(57) ABSTRACT

A process comprising:
(i) providing a first polyethylene, prepared independently, having a melt index in the range of about 5 to about 3000 grams per 10 minutes and a density in the range of about 0.900 to about 0.975 gram per cubic centimeter and a second polyethylene, prepared independently, having a flow index in the range of about 0.01 to about 30 grams per 10 minutes and a density in the range of about 0.860 to about 0.940 gram per cubic centimeter, the weight ratio of the first polyethylene to the second polyethylene being in the range of about 75:25 to about 25:75;
(ii) blending the first polyethylene with the second polyethylene;
(iii) melting the blend; and, prior to extrusion or pelletizing,
(iv) passing the molten blend through one or more active screens, in the case of two or more active screens, positioned in series, each active screen having a micron retention size in the range of about 2 to about 70, at a mass flux of about 5 to about 100 pounds per hour per square inch.

7 Claims, No Drawings

PROCESS FOR PREPARING A SIMULATED IN SITU POLYETHYLENE BLEND

TECHNICAL FIELD

This invention relates to a process for preparing a simulated in situ polyethylene blend, which can be converted into film having a small number of or essentially no gels (or fish-eyes).

BACKGROUND INFORMATION

Polyethylenes of various densities have been prepared and converted into film characterized by excellent tensile strength, high ultimate elongation, good impact strength, and excellent puncture resistance. These properties together with toughness are enhanced when the polyethylene is of high molecular weight. However, as the molecular weight of the polyethylene increases, the processability of the resin usually decreases. By providing a blend of polymers of high molecular weight and low molecular weight, the properties characteristic of high molecular weight resins can be retained and processability, particularly extrudability (a characteristic of the lower molecular weight component) can be improved.

The blending of these polymers is successfully achieved in a staged reactor process similar to those described in U.S. Pat. Nos. 5,047,468 and 5,149,738. Briefly, the process is one for the in situ blending of polymers wherein a high molecular weight ethylene copolymer is prepared in one reactor and a low molecular weight ethylene copolymer is prepared in another reactor. The process typically comprises continuously contacting, under polymerization conditions, a mixture of ethylene and one or more alpha-olefins with a catalyst system in two gas phase, fluidized bed reactors connected in series, said catalyst system comprising: (i) a supported magnesium/titanium based catalyst precursor; (ii) one or more aluminum containing activator compounds; and (iii) a hydrocarbyl aluminum cocatalyst, the polymerization conditions being such that an ethylene copolymer having a melt index in the range of about 0.1 to about 1000 grams per 10 minutes is formed in the high melt index (low molecular weight) reactor and an ethylene copolymer having a melt index in the range of about 0.001 to about 1 gram per 10 minutes is formed in the low melt index (high molecular weight) reactor, each copolymer having a density of about 0.860 to about 0.965 gram per cubic centimeter and a melt flow ratio in the range of about 22 to about 70, with the provisos that:

(a) the mixture of ethylene copolymer matrix and active catalyst precursor formed in the first reactor in the series is transferred to the second reactor in the series;

(b) other than the active catalyst precursor referred to in proviso (a), no additional catalyst is introduced into the second reactor.

While the in situ blends prepared as above and the films produced therefrom are found to have the advantageous characteristics heretofore mentioned, the commercial application of these granular bimodal polymers for high clarity film applications is frequently limited by the level of gels obtained. Particle size distribution and flow characteristics studies indicate that the gas phase resins having an average particle size (APS) of about 400 to about 600 microns exhibit significant compositional, molecular, and rheological heterogeneities. When such a granular resin is compounded, for example, with a conventional twin screw mixer in a single pass, and the resulting pellets are fabricated into film, the film exhibits a high level of gels ranging in size from less than about 100 microns to greater than about 500 microns. These gels adversely affect the aesthetic appearance of the product. The gel characteristics of a film product are usually designated by a subjective scale of Film Appearance Rating (FAR) varying from minus 50 (very poor; these films have a large number of large gels) to plus 50/plus 60 (very good; these films have a small amount of, or essentially no, gels). The FAR of the single pass film product mentioned above is generally in the range of about minus 50 to about minus 10/0. For commercial acceptability, the FAR should be plus 20 or better.

In addition to the FAR problem, in situ blends, which meet the film manufacturer's requirements, have to be custom made in two reactors connected in series under defined conditions. It would, of course, simplify matters if the high melt index polymer and the low melt index polymer could be purchased separately since they more readily fall within the off-the-shelf spectrum of available polymers.

This option has been explored, and blends of various polymers have been found to provide desirable bimodal characteristics. The blending has been traditionally carried out by dry blending and/or melt blending. These blends, however, have never been able to overcome the FAR problem.

DISCLOSURE OF THE INVENTION

An object of this invention, therefore, is to provide a process for preparing a simulated in situ blend from two independently prepared gas phase polymers, which blend not only has desirable bimodal characteristics, but can be extruded into a film having a relatively high FAR. Other objects and advantages will become apparent hereinafter.

According to the present invention such a process has been discovered. The process comprises:

(i) providing a first polyethylene, prepared independently, having a melt index in the range of about 5 to about 3000 grams per 10 minutes and a density in the range of about 0.900 to about 0.975 gram per cubic centimeter and a second polyethylene, prepared independently, having a flow index in the range of about 0.01 to about 30 grams per 10 minutes and a density in the range of about 0.860 to about 0.940 gram per cubic centimeter, the weight ratio of the first polyethylene to the second polyethylene being in the range of about 75:25 to about 25:75;

(ii) blending the first polyethylene with the second polyethylene;

(iii) melting the blend; and, prior to extrusion or pelletizing, (iv) passing the molten blend through one or more active screens, in the case of two or more active screens) positioned in series, each active screen having a micron retention size in the range of about 2 to about 70, at a mass flux of about 5 to about 100 pounds per hour per square inch.

DESCRIPTION OF THE PREFERRED EMBODIMENT(S)

The first and second polyethylenes can be homopolymers of ethylene or copolymers of ethylene and at least one alpha-olefin comonomer having 3 to 8 carbon atoms, preferably one or two alpha-olefin comonomers provided that they have the necessary melt indices, flow indices, and densities. The alpha-olefins can be, for example, propylene.

1-butene, 1-hexene, 4-methyl-1-pentene, and 1-octene. The preferred comonomer combination is 1-butene and 1-hexene.

It will be understood that the simulated in situ blend can be characterized as a bimodal resin. The properties of bimodal resins are strongly dependent on the proportion of the high molecular weight component, i.e., the low melt index component.

Each of the resins can be produced in the gas phase using a magnesium/titanium based catalyst system, which can be exemplified by the catalyst system described in U.S. Pat. No. 4,302,565. These resins can also be produced in a slurry or solution phase. Further, the catalyst system can be a vanadium based catalyst system such as that described in U.S. Pat. No. 4,508,842; a chromium based catalyst system such as that described in U.S. Pat. No. 4,101,445; a metallocene catalyst system such as that described in U.S. Pat. No. 5,317,036; or other transition metal catalyst systems. Many of these catalyst systems are often referred to as Ziegler-Natta catalyst systems. Catalyst systems, which use chromium or molybdenum oxides on silica-alumina supports, are also useful. Subject process should be operative with all of the various catalyst systems useful in preparing polyethylene.

A typical magnesium/titanium catalyst system can be described as follows:

The solid particulate precursor can be supported or unsupported. Another catalyst system is one where the precursor is formed by spray drying and used in slurry form. Such a catalyst precursor, for example, contains titanium, magnesium, and aluminum halides, an electron donor, and an inert filler. The precursor is then introduced into a hydrocarbon medium such as mineral oil to provide the slurry form. This is described in U.S. Pat. No. 5,290,745.

The electron donor, if used in the catalyst precursor, is an organic Lewis base, liquid at temperatures in the range of about 0° C. to about 200° C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound is optional, but is often used with any of the titanium based catalyst precursors. Thus, the term "catalyst precursor" is considered to include activated catalyst precursors. The activator can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. A particularly preferred activator is a mixture of diethylaluminum chloride and tri-n-hexylaluminum. If it is desired to use an activator, about 0.10 to about 10 moles, and preferably about 0.15 to about 2.5 moles, of activator can be used per mole of electron donor. The molar ratio of activator to titanium can be in the range of about 1:1 to about 10:1 and is preferably in the range of about 2:1 to about 5:1. The activator is preferably added separately neat or as a solution in an inert solvent, such as isopentane, to the polymerization reactor at the same time as the flow of ethylene is initiated.

The cocatalyst, generally a hydrocarbyl aluminum cocatalyst, can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum dihydride, di-isobutyl-hexylaluminum, isobutyl dihexylaluminum, trimethyl-aluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

In those cases where it is desired to support the precursor, silica is the preferred support. As noted above, using a support such as silica having the required span will produce a resin having the required span by substantial replication. Other suitable supports are inorganic oxides such as aluminum phosphate, alumina, silica/alumina mixtures, and silica modified with reagents capable of reacting with surface silanols such aluminum compounds exemplified by alkylaluminums and aluminum halides, boron alkyls and halides, dialkyl zincs, and hexamethyldisilazane. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 0.5 millimole of titanium per gram of support and preferably about 0.2 to about 0.3 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in slurry form.

As mentioned above, the catalyst precursor can be obtained by spray drying. In this option, a solution of the precursor is prepared and slurried with an inert filler. The slurry is then spray dried by methods such as disclosed in U.S. Pat. No. 5,290,745. Generally, the amount of inert filler used is that which will provide about 0.3 to about 2.5 millimole of titanium per gram of spray-dried precursor. The fillers which are added to the solution prior to spray drying include any organic or inorganic compounds, which are inert to the titanium compound and the final active catalyst, such as silicon dioxide in the form of fumed silica, titanium dioxide, polystyrene, rubber modified polystyrene, magnesium chloride, and calcium carbonate. The fillers can be used individually or in combination. The spray dried precursor is about 10 to about 95 percent by weight filler. Typical Mg/Ti atomic ratios in the spray dried precursor range from about 3:1 to about 10:1. Average particle size can be adjusted by process means during spray-drying, and can be, furthermore, altered by separation techniques after spray-drying. Typical average particle sizes range from about 10 to about 30 microns using standard shaping and sizing techniques.

U.S. Pat. No. 5,106,926 provides another example of a magnesium/titanium based catalyst system comprising:

(a) a solid particulate catalyst precursor having the formula $MgdTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compounds.

The electron donor, the support, and the cocatalyst are the same as those described above. The modifier can have the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1. Since the modifier reacts with the precursor, it becomes part of the precursor.

A typical vanadium based catalyst system is comprised of (a) a vanadium compound or the reaction production of a vanadium compound and an electron donor (optional) as catalyst precursor; (b) a hydrocarbyl aluminum and/or a hydrocarbyl aluminum halide cocatalyst; and, optionally, (c) a halocarbon promoter. This system can be described in more detail as follows.

The vanadium compound can be any of the group of vanadium compounds well known to be useful as or in catalyst precursors in olefin polymerization processes. Examples are vanadium acetylacetonates., vanadium trihalides, vanadium tetrahalides, and vanadium oxyhalides. The halides are generally chlorides, bromides, or iodides, or mixtures thereof. More specific examples of these compounds are $VCl_3$, $VCl_4$, vanadium (acetylacetonate)$_3$, vanadyl triacetylacetonate, $VO(OC_2H_5)Cl_2$, $VOCl(OC_2H_5)_2$, $VO(OC_2H_5)_3$, and $VO(OC_4H_9)_3$. The electron donor, if used, is the same as those mentioned above for the magnesium/titanium based catalyst systems.

Promoters are also an optional, but preferred, component of the catalyst system. Chlorinated or perchlorinated esters are suitable promoters. Examples of these esters are $Cl_3CCOOC_2H_5$; $CCl_3CCl=CClCOOC_4H_9$; $C_6H_5CCl_2COOR$ wherein R is an alkyl radical having 1 to 8 carbon atoms; and $Cl_2C=CCl-CCl_2COOC_4H_9$. Other suitable halocarbon promoters have the following formula:

wherein R=hydrogen or an unsubstituted or halogen substituted alkyl radical having 1 to 6 carbon atoms;

X=a halogen; and y=0, 1, or 2.

Preferred promoters of this group include flouro-, chloro-, and bromo-substituted methane and ethane wherein there are at least two X atoms, e.g., methylene dichloride, 1,1,1-trichloroethane, chloroform, $CBr_4$, $CFCl_3$, hexachloroethane, $CH_3CCl_3$, and $CF_2ClCCl_3$. The first three mentioned promoters are especially preferred. About 0.1 to about 10 moles, and preferably about 0.2 to about 2 moles, of promoter can be used per mole of cocatalyst.

The modifiers, cocatalysts, and supports are the same for both the vanadium and titanium based catalyst systems. When a support is not desired, the catalyst precursor can be used in liquid form.

Where modifiers are used, they are usually dissolved in an organic solvent such as isopentane and impregnated into the support following impregnation of the vanadium or titanium compound or complex, after which the supported catalyst precursor is dried. The cocatalyst is preferably added separately neat or as a solution in an inert solvent, such as isopentane, to the prepolymerization or polymerization reaction at the same time as the flow of ethylene is initiated.

Useful molar ratios for a vanadium based catalyst system are about as follows:

|  | Broad | Preferred |
| --- | --- | --- |
| ED:V (where ED is used) | 1:1 to 20:1 | 1:1 to 10:1 |
| modifier:V | 1:1 to 10:1 | 2:1 to 5:1 |

Polymerization is conducted substantially in the absence of catalyst poisons such as moisture, oxygen, carbon monoxide, carbon dioxide, and acetylene.

With respect to the high melt index (or low molecular weight) polymer:

The high melt index can be in the range of about 5 to about 3000 grams per 10 minutes, and is preferably in the range of about 5 to about 1000 grams per 10 minutes. The molecular weight of the high melt index polymer is, generally, in the range of about 15,800 to about 35,000. The density of the polymer prepared in this reactor can be at least 0.900 gram per cubic centimeter, and is preferably in the range of 0.910 to 0.975 gram per cubic centimeter. The melt flow ratio of this polymer can be in the range of about 20 to about 70, and is preferably about 20 to about 45.

Melt index is determined under ASTM D-1238, Condition E. It is measured at 190° C. and 2.16 kilograms and reported as grams per 10 minutes. Flow index is determined under ASTM D-1238, Condition F. It is measured at 190° C. and 10 times the weight used in determining the melt index, and reported as grams per 10 minutes. Melt flow ratio is the ratio of flow index to melt index.

With respect to the low melt index polymer:

Because of the low melt index values, instead of melt index, flow index is determined and those values are used in this specification. The flow index can be in the range of about 0.01 to about 30 grams per 10 minutes, and is preferably in the range of about 0.2 to about 12 grams per 10 minutes. The molecular weight of this polymer is, generally, in the range of about 135,000 to about 445,000. The density of the polymer can be at least 0.860 gram per cubic centimeter, and is preferably in the range of 0.900 to 0.940 gram per cubic centimeter. The melt flow ratio of the polymer can be in the range of about 20 to about 70, and is preferably about 22 to about 45.

The blend or final product can have a melt index in the range of about 0.02 to about 3.5 grams per 10 minutes, and preferably has a melt index in the range of about 0.04 to about 2.0 grams per 10 minutes, or a flow index in the range of about 4 to about 165 grams per 10 minutes. The melt flow ratio is at least about 50, and is preferably in the range of about 55 to about 185. The molecular weight of the final product is, generally, in the range of about 90,000 to about 450,000. The density of the blend is at least 0.915 gram per cubic centimeter, and is preferably in the range of 0.916 to 0.960 gram per cubic centimeter.

As noted above, the blend has a broad molecular weight distribution which can be characterized as bimodal. The broad molecular weight distribution can be reflected in an Mw/Mn ratio of about 8 to about 44, preferably about 20 to about 30. Mw is the weight average molecular weight; Mn is the number average molecular weight; and the Mw/Mn ratio can be referred to as the polydispersity index, which is a measure of the breadth of the molecular weight distribution.

The weight ratio of the low melt index (high molecular weight) polymer to high melt index (low molecular weight) polymer in the blend can be in the range of about 0.4:1 to about 2.5:1, and is preferably in the range of about 0.75:1 to about 1.6:1. This is known as the split ratio or split. Alternatively, the weight ratio of the low melt index polymer to the high melt index polymer can be in the range of about 75:25 to about 25:75, and is preferably in the range of about 60:40 to about 40:60.

Typically, the transition metal based catalyst system, ethylene, alpha-olefin, and hydrogen are continuously fed into a polymerization reactor, and the high melt index polymer or low melt index polymer, as the case may be, is continuously removed from the reactor.

In the preparation of the high melt index polymer:

The mole ratio of alpha-olefin to ethylene can be in the range of about 0.005:1 to about 0.6:1, and is preferably in the range of about 0.01:1 to about 0.42:1. The mole ratio of hydrogen to ethylene can be in the range of about 0.5:1 to about 3:1, and is preferably in the range of about 1.7:1 to about 2.2:1. The operating temperature is generally in the range of about 70° C. to about 110° C. As mentioned above, the temperature is preferably varied with the desired density.

In the preparation of the low melt index (as reflected in flow index) polymer:

The mole ratio of alpha-olefin to ethylene can be in the range of about 0.01:1 to about 0.4:1, and is preferably in the range of about 0.02:1 to about 0.26:1. The mole ratio of hydrogen (if used) to ethylene can be in the range of about 0.001:1 to about 0.3:1, and is preferably in the range of about 0.017:1 to about 0.18:1. The operating temperature is generally in the range of about 60° C. to about 100° C. Preferred operating temperatures vary depending on the density desired, i.e., lower temperatures for lower densities and higher temperatures for higher densities.

The pressure, i.e., the total pressure in either reactor, can be in the range of about 200 to about 450 psi and is preferably in the range of about 280 to about 350 psig. The upper limit of ethylene partial pressure is set according to the amount of copolymer it is desired to produce the reactor. The balance of the total pressure is provided by alpha-olefin other than ethylene and an inert gas such as nitrogen.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

A typical fluidized bed reactor is described in U.S. Pat. No. 4,482,687, and a typical fluidized bed polymerization procedure is described in U.S. Pat. No. 4,302,565.

The gaseous feed streams of ethylene, other gaseous alpha-olefins, and hydrogen, when used, are preferably fed to the reactor recycle line as well as liquid alpha-olefins and the cocatalyst solution. Optionally, the liquid cocatalyst can be fed directly to the fluidized bed. Where an activator is used, the partially activated or completely activated catalyst precursor is preferably injected into the fluidized bed as a solid or a mineral oil slurry. In the case of partial activation, activator is added to the reactor. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate and the ethylene partial pressure.

The hydrogen:ethylene molar ratio can be adjusted to control average molecular weights. The alpha-olefin (other than ethylene) can be present in a total amount of up to 15 percent by weight of the copolymer and are preferably included in the copolymer in a total amount of about 1 to about 10 percent by weight based on the weight of the copolymer.

The residence time of the mixture of reactants including gaseous and liquid reactants, catalyst, and resin in the fluidized bed can be in the range of about 1 to about 12 hours and is preferably in the range of about 2 to about 5 hours.

As noted above, steps (ii) to (iv) are carried out prior to extrusion or pelletizing. For the purposes of this specification, the term "extrusion" is considered to include conventional extrusion processes such as blown tubular film extrusion and pipe and sheet extrusion, and blow molding, injection molding, rotational molding, slot casting, and other similar forms of resin processing. With respect to steps (ii)

and (iii), the high melt index polymer (first polyethylene) and the low melt index polymer (second polyethylene) can be dry blended using conventional dry blending techniques or melt blended, again by using conventional melt blending techniques. Alternatively, the resins can be first dry blended and then melt blended or they can be melted separately; and then blended. In any case, the blend is placed in a molten state prior to step (iv). The molten blend can be prepared in a melter/mixer, which can take the form of a single screw extruder, a twin screw extruder/mixer, or a batch type mixer such as a BANBURY$^a$ or a BRABENDER$^a$ mixer. Tangential and intermeshing counter-rotating and intermeshing co-rotating mixers, two stage mixers, and multistage long length/diameter mixers can also be used. Also see the mixing systems in U.S. Pat. Nos. 4,334,783 and 5,458,474.

The next step, i.e., step (iv), is to pass the molten blend through one or more active screens. When two or more active screens are used, the screens are positioned in series. The preferred number of active screens is 3. While more than 3 active screens can be used, it is desirable to use as few active screens over the number of 3 as possible, but up to 6 active screens may provide advantages in some cases. Active screens are those screens, which participate directly in the process of the invention, which results in a homogeneous blend comparable to the homogeniety of an in situ blend and gel reduction. Passive screens can also be, and are preferably, present in order to structurally reinforce the active screens. The passive screens do not, however, appear to contribute to the homogeneity and gel reduction. The active screens have a micron retention size in the range of about 2 to about 70. It is observed that these active screens contribute to the break up of gels into gels having sizes in largest dimension equal to or less than 200 microns. In effect, the active screen openings are large enough to essentially avoid capturing the gels, but small enough to break up the gels into the aforementioned sizes. The passive screens have micron retention sizes larger than 70, preferably much larger, since their function is reinforcement rather than homogeneity and gel reduction. For example, an active 325 mesh screen can be reinforced with 20 and 100 passive mesh screens. In any case, the passive screens do not capture or break up gels. It will be understood that the term "screens" includes screens, sieves, and other filter media, and other equivalents for which the micron retention size can be determined. A description of various filter media can be found in Filtration of Plastic Melts, ed. D. Gneuss, publ. Gneuss Kunststofftechnik, Germany, 1988, pages 14 and 15; Filtration of Polymer Melts, publ. VDI-Verlag, DŸsseldorf, Germany, 1981, pages 1 to 7; Anderson Wire Works (Houston, Tex.) product data sheet, which describes its extruder screens in terms of micron retention; and Handbook of Chemistry, 10th Edition, 1961, pages 910 to 912. Generally, the screens are arranged by beginning with the larger micron retention size, proceeding to a smaller micron retention size, and ending with a larger micron retention size.

The screens can be, for example, square weave wire screens and Dutch weave wire screens, one of which is described as an 80 mesh by 700 mesh screen. The screens or equivalents can have closely spaced square openings, triangular openings, or round openings, regular or irregular in shape. With regard to equivalents, there are generally one or more layers corresponding to the one or more screens mentioned above. Equivalents are, for example, wire cloth screens, which have the disadvantage of letting certain soft particles slip through under pressure; sintered metal powders of the same or different diameters, but it is difficult to control the size of the spaces between the particles in order to approximate micron retention sizes; sintered metal fibers, a preferred equivalent; sand packs; and devices such as those described in U.S. Pat. No. 4,661,249.

The resin melt is passed through the screen(s) at a mass flux in the range of about 5 to about 100 pounds per hour per square inch of active screen, and preferably at a mass flux in the range of about 30 to about 80 pounds per hour per square inch of active screen. Generally, only one pass through the screen(s) at the defined mass flux is sufficient to reduce the gels to 200 microns or less, usually less than 100 microns. It is found that at least a major proportion of the gels can be reduced to sizes of less than 100 microns by the process of the invention. Multiple passes can be used, if desired.

The resin blend can be extruded into film in a conventional extruder adapted for that purpose. Extruders and processes for extrusion are described in U.S. Pat. Nos. 4,169,679 (see screw design); 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. Twin screw extruders should also be considered. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C, and is preferably carried out at temperatures in the range of about 180 to about 240 degrees C. It will be understood that the resin blend is useful in any application where exceptionally well mixed resins are desired, e.g., in wire and cable, pipe, hose and tubing, injection molding, blow molding, and slot casting applications.

The advantages of the invention lie in the homogeneity of the blend, i.e., a homogeneity comparable to in situ blends; in FAR values of plus 20 or higher, which are consistently achieved in the film prepared from the resin blend; the capability of utilizing off-the-shelf polymers; and the desirable bimodal characteristics of the blend.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts up to 200 parts by weight and more for each 100 parts by weight of the blend.

Patents mentioned in this specification are incorporated by reference herein.

The invention is illustrated by the following examples.

EXAMPLE

Comparative testing is carried out with (i) a double mixing head, two stage 2.5 inch single screw extruder system; (ii) an 8 pound BANBURY$^a$ batch type mixing system; and (iii) a 1.5 inch extruder system with a conventional metering screw without a mixing head, but with a gear pump. The gear pump is used to eliminate the effect of back pressure and subsequently improve mixing in the upstream extruder. Each system employs a conventional pelletizing system for converting the molten resin into pellets. The pellets produced are employed to make film, and the FAR of the film is determined. FAR is an indirect measurement of the amount of gels in a resin. Properties of the resin blends used in the tests are set forth in Table I:

TABLE I

| Resin | A | B | C |
|---|---|---|---|
| Viscosity ratio based on melt index | 60,500 | 37,600 | 53.940 |
| High molecular weight component: | | | |
| Weight percent in blend | 55 | 58 | 60 |
| melt index (grams/10 minutes) | 0.0081 | 0.013 | 0.017 |
| flow index (grams/10 minutes) | 0.22 | 0.35 | 0.45 |
| melt flow ratio | 27 | 27 | 27 |
| density (gram/cc) | 0.938 | 0.942 | 0.930 |
| Low molecular weight component: | | | |
| Weight percent in blend | 45 | 42 | 40 |
| melt index (grams/10 minutes) | 490 | 490 | 917 |
| flow index (grams/10 minutes) | 13230 | 13230 | 24760 |
| melt flow ratio | 27 | 27 | 27 |
| density (gram/cc) | 0.961 | 0.961 | 0.967 |

Each of the resin blends are mixed in the above systems prior to pelletizing and extrusion into film. As noted in Table II, resins B and C are additionally mixed through mesh screens. The resins are then pelletized and extruded into film, and, then, an FAR determination is made. The film is one mil thick. Each of the variables are set forth in Table II as follows:

TABLE II

| System | (i) | (ii) | (iii) | (iii) |
|---|---|---|---|---|
| Resin blend | A | B | C | C |
| Rate (pounds per hour) | — | — | 30 | 30 |
| Extruder discharge pressure (psig) | — | — | 2200 | 2200 |
| Gear pump discharge pressure (psig) | — | — | 4500 | 5720 |
| Layer(s) of screens/mesh (US Sieve Series) | none | one/40 | one/20 | * |
| Number of active screens | none | one | one | two |
| Number of passive screens | none | none | none | two |
| Mass flux (pounds per hour per square inch) | — | 4.5 | 28 | 28 |
| Nominal micron retention size (microns) | — | 380 | 800 | 25 |
| FAR | less than minus 30 | minus 30 | minus 60 | plus 15 |

TABLE II-continued

| System | (iii) | (iii) |
|---|---|---|
| Resin blend | C | C |
| Rate (pounds per hour) | 10 | 10 |
| Extruder discharge pressure (psig) | 2200 | 2200 |
| Gear pump discharge pressure (psig) | 4500 | 5720 |
| Layer(s) of screens/mesh (US Sieve Series) | one/20 | * |
| Number of active screens | one | two |
| Number of passive screens | none | two |
| Mass flux (pounds per hour per square inch) | 9.4 | 9.4 |
| Nominal micron retention size (microns) | 800 | 25 |
| FAR | minus 30 | plus 45 |

*one 20 mesh square weave wire screen followed by two 80 mesh by 700 mesh Dutch weave wire screens followed by one 20 mesh square weave wire screen.

Notes to example and Tables:

1. Density is measured by producing a plaque in accordance with ASTM D-1928, procedure C, and then testing as is via ASTM D-1505. The density is reported in gram per cubic centimeter.

2. FAR is the film appearance rating, a rating derived by visual inspection of the film as discussed above. The rating system is a rating of visual defects in a film sample. The scale ranges from minus 100 to plus 70 with higher positive numbers indicating fewer defects. The FAR test is conducted by comparing film samples to a standard with a given FAR rating.

What is claimed is:

1. A process comprising:
    (i) providing a first polyethylene, prepared independently, having a melt index in the range of about 5 to about 3000 grams per 10 minutes and a density in the range of about 0.900 to about 0.975 gram per cubic centimeter and a second polyethylene, prepared independently, having a flow index in the range of about 0.01 to about 30 grams per 10 minutes and a density in the range of about 0.860 to about 0.940 gram per cubic centimeter, the weight ratio of the first polyethylene to the second polyethylene being in the range of about 75:25 to about 25:75;
    (ii) blending the first polyethylene with the second polyethylene:
    (iii) melting the blend; and, prior to extrusion or pelletizing,
    (iv) passing the molten blend through one or more active screens, in the case of two or more active screens, positioned in series, each active screen having a micron retention size in the range of about 2 to about 70, at a mass flux of about 5 to about 100 pounds per hour per square inch.

2. The process defined in claim 1 wherein the first polyethylene has a melt index in the range of about 5 to about 1000 grams per 10 minutes and a density in the range of about 0.910 to about 0.975 gram per cubic centimeter and the second polyethylene has a flow index in the range of about 0.2 to about 12 grams per 10 minutes and a density in the range of about 0.900 to about 0.940 gram per cubic centimeter, the weight ratio of the first polyethylene to the second polyethylene being in the range of about 60:40 to about 40:60.

3. The process defined in claim 1 wherein the blend has a melt index in the range of about 0.02 to about 3.5 gram per 10 minutes, a melt flow ratio in the range of about 55 to about 135: a density in the range of 0.915 to 0.960 gram per cubic centimeter; and an Mw/Mn ratio of about 10 to about 40.

4. The process defined in claim 3 wherein the blend has a melt index in the range of about 0.04 to about 2.0 grams per 10 minutes; a melt flow ratio in the range of about 55 to about 125; a density in the range of 0.916 to 0.960 gram per cubic centimeter; and an Mw/Mn ratio of about 20 to about 30.

5. The process defined in claim 1 wherein the number of active screens is 2 to 6.

6. The process defined in claim 5 wherein the number of active screens is 3.

7. The process defined in claim 1 wherein there are one or more passive screens to reinforce the active screens.

* * * * *